United States Patent Office 3,538,707
Patented Nov. 10, 1970

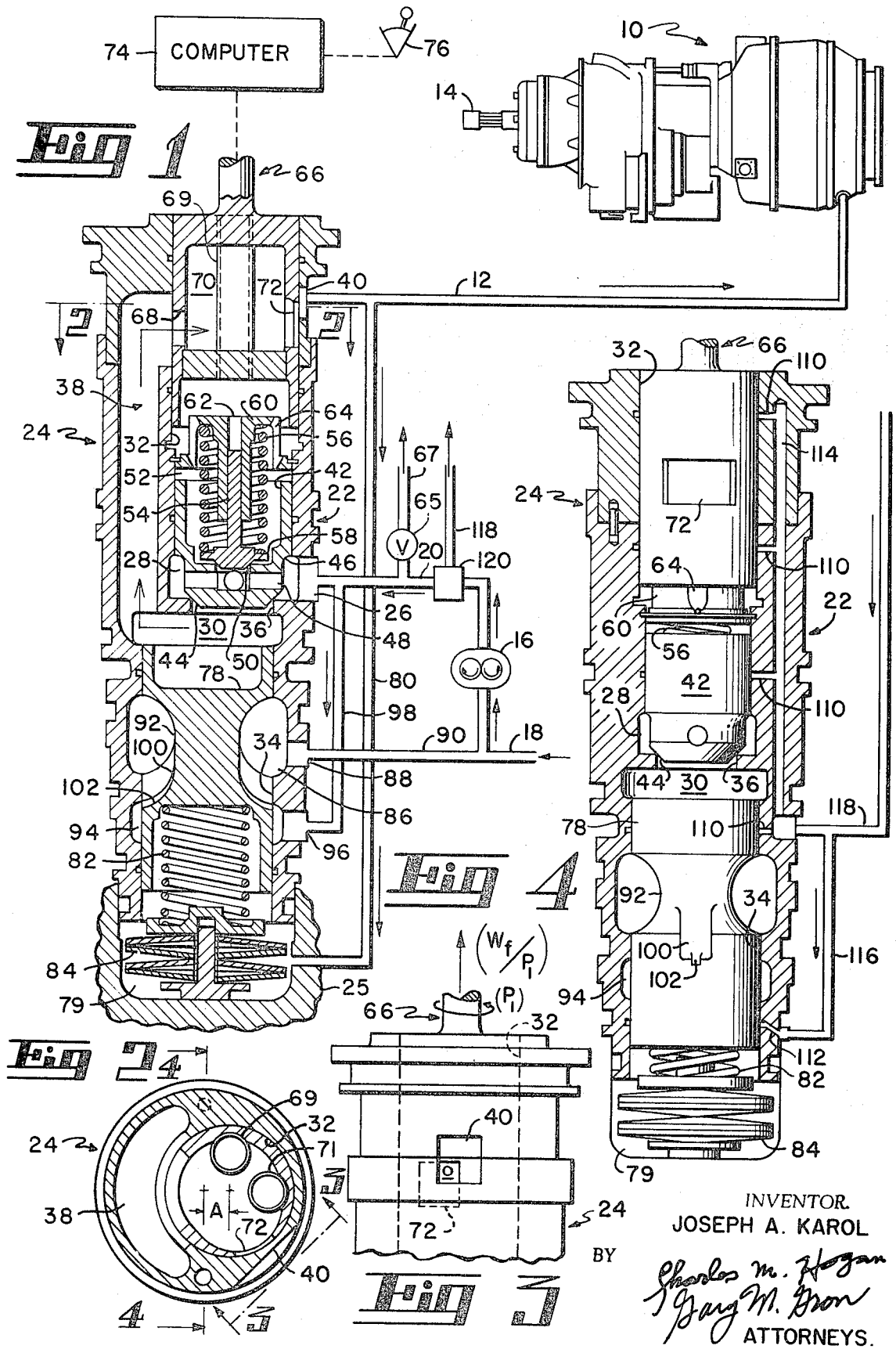

3,538,707
FUEL FLOW CONTROL VALVE FOR GAS TURBINE
Joseph A. Karol, Woodbridge, Conn., assignor to Avco Corporation, Stratford, Conn., a corporation of Delaware
Filed Apr. 1, 1969, Ser. No. 812,273
Int. Cl. F02c 9/04
U.S. Cl. 60—39.28                    11 Claims

ABSTRACT OF THE DISCLOSURE

The disclosure illustrates a compact, multiple-function flow control valve assembly for use in a fuel control system of a gas turbine engine. The valve assembly has, in a single elongated cylindrical housing, a flow-compensated pressure-regulating valve, a pressurizing valve, cutoff valve, relief valve, and a force-balanced metering valve. The metering valve is linearly displaceable primarily as a function of operator demand and angularly displaceable primarily as a function of the altitude of the engine so that the metering area of the valve is a product of the two displacement inputs.

BACKGROUND OF THE INVENTION

The present invention relates to flow control devices and more particularly to multiple-function flow control devices for use in gas turbine engine fuel control systems.

As the gas turbine engine has achieved a high state of development, so has the fuel control system that provides the engine with a controlled supply of fuel. One result of this development is that current fuel controls are complex, expensive and precision devices requiring extremely skilled personnel to assemble and maintain them. This is due in part to the fact that the functions a fuel control commonly incorporates (pressure regulating, pressurizing, metering and pressure relief) are provided by separate valve assemblies in present fuel controls.

SUMMARY OF THE INVENTION

Accordingly, it is an object of the present invention to provide a highly simplified, compact and effective multiple-function valve which incorporates most, if not all, of the flow control functions necessary in a gas turbine engine fuel control system.

These ends are achieved in a broad sense by a multiple-function flow control valve comprising a generally cylindrical elongated housing having an inlet port adjacent its middle and an outlet port adjacent a first end. The inlet port receives pressurized fuel and the outlet port delivers fuel to a gas turbine engine. The housing has a chamber formed in the middle of the housing and connected to the inlet port. A first longitudinal bore extends from the chamber to the first end of the housing and is eccentric with respect to the axis of the housing. A second bore extends from the chamber to the second end of the housing and is coaxial with the axis of the housing. An opening is formed in the inlet chamber to separate the chamber into first and second sections, the first section being connected to the inlet port and the first bore and the second section being connected to the second bore. A means is provided for forming a flow path having a generally semicircular cross-sectional shape and extending from the second section of the chamber through the housing alongside of the first bore to the outer end of the first bore approximately in line with the outlet.

A pressurizing valve is displaceable in the inner end of the first bore to permit flow to the second chamber when a predetermined valve inlet pressure is exceeded. A pressure-regulating valve is displaceable in the second bore for maintaining a predetermined pressure differential across a metering valve. The metering valve is displaceable in the outer end of the first bore in response to exterior control inputs for forming a variable area orifice so that the flow from the multifunction valve is directly proportional to the area of the orifice.

DESCRIPTION

The above and other related objects and features of the invention will be apparent from a reading of the following description of the disclosure found in the accompanying drawing and the novelty thereof pointed out in the appended claims.

In the drawing:

FIG. 1 shows a longitudinal section of a multifunction valve embodying the present invention, along with a gas turbine engine with which it may be used;

FIG. 2 is a cross section view of the valve shown in FIG. 1, taken on lines 2—2 of FIG. 1;

FIG. 3 has an enlarged fragmentary view of the valve shown in FIGS. 1 and 2, taken in the direction of lines 3—3 of FIG. 2;

FIG. 4 shows a longitudinal section of the housing of the valve assembly of FIG. 1 in the direction of lines 4—4 of FIG. 2 and showing an exterior view of valve elements displaceable in the housing.

FIG. 1 illustrates a gas turbine engine 10 with which the flow control valve of the present invention may be used. The gas turbine engine 10 is a well-known type of engine and it is not necessary for a proper understanding of the present invention to undertake a detailed discussion of its operation. For present purposes it is sufficient to say that engine 10 receives a metered supply of fuel from a supply conduit 12. The fuel is injected into a combustion chamber (not shown), mixed with pressurized air and ignited to generate a propulsive gas stream. The propulsive gas stream may be used to provide a reaction thrust or may be discharged across a power turbine (not shown) to drive an output shaft 14, as herein shown.

The fuel supply conduit 12 receives a supply of fuel from a fuel control system comprising an engine-driven pump 16 receiving a suitably supply of fuel via a pump supply conduit 18 and pressurizing it for delivery through a conduit 20 to a flow control valve 22. The flow control valve 22 comprises a generally cylindrical, elongated two-piece housing 24 secured in an outer casing 25. For ease of explanation, only a small portion of casing 25 is shown in FIG. 1. Housing 24 has an inlet port 26 leading to a centrally positioned chamber comprising a first portion 28 and a second portion 30. A first longitudinal bore 32 extends from the first portion of the chamber to one end of the housing 24. The bore 32 is parallel to the axis of housing 24 but is eccentric with respect thereto, as shown particularly by distance A in FIG. 2. A second bore 34 extends from the second chamber to the opposite end of housing 24 and is coaxial with the axis of housing 24. An opening 36, coaxial with the bore 32, is positioned between chambers 28 and 30. A passageway 38 extends from chamber 30 alongside bore 32 to a point adjacent its outer end and approximately in line with an outlet port 40 which connects to the nozzle supply conduit 12.

A pressurizing valve element 42 is displaceable in the inner end of bore 32 and has a beveled outer end 44 adapted to seat against opening 36. A shoulder 46 is formed adjacent the outer end 44 of the valve 42 so that when the valve end 44 is seated against orifice 36 there is an effective area over which fuel pressure can act to unseat valve 42. A series of radial ports 48 are formed in the outer end of valve 42 and connect with a centrally positioned relief port 50 leading to the inner side 52 of valve 42. A poppet valve element 54 is urged against the port 50 by a spring 56 acting on a radial flange 58 of the poppet 54. The spring 56 is received in a recess of a cup-shaped support element 60, suitably secured to the walls of bore 32. The support element 60 has an opening 62 into which the plunger 54 is telescoped to guide its movement. A plurality of ports 64 provide a flow path from the inner side of the valve element 42 to the middle portion of the bore 32.

To enable the pressurizing valve 42 to act in a cutoff function, an operator-controlled valve 65 is positioned in a conduit 67 leading to a low pressure discharge point. When valve 65 is opened, pressure in chamber 28 drops sufficiently to cause valve 42 to seat against opening 36 and block flow into chamber 30.

A cylindrical metering valve element 66 is displaceable in the outer end of the bore 32 and has a first port 68 permitting flow of fuel from passageway 38 to an interior chamber 70 and second port 72 which cooperates with port 40 of housing 24 to form a variable area orifice O, as shown in FIG. 3. A pair of longitudinal open-ended tubes 69, 71 extend through metering valve element 66 to connect the inner side of pressurizing valve element 42 to a suitable low pressure discharge point.

The valve element 66 is linearly and angularly displaced by a computer actuator assembly 74 (note the mechanical connection) which receives demand inputs from an operator-controlled lever 76 and modifies them to provide safe operating conditions for the engine. It is to be understood that the computer actuator 74 may take a number of forms, as is apparent to one skilled in the art. The device may be electrical, hydromechanical, mechanical, or a combination of these.

As shown in FIG. 3, the valve 66 is linearly displaced as a function of $W_f/P_1$ where $W_f$ represents the fuel flow to engine 10 and $P_1$ is the inlet pressure to the engine 10 which reflects the altitude at which the engine is operating. The level of $W_f/P_1$ represents a given ratio between these values and this ratio primarily is a function of operator demand, modified by certain parameters to insure safe engine operation. The valve element 66 is angularly displaced in response to $P_1$. As a result, the area of the orifice O, formed by the ports in valve element 66 in the housing 24, is a multiplied function of the two inputs so that the final area is proportional to a desired fuel flow.

To insure that the flow rate through the orifice O is a direct function of its area, a pressure-regulating spool-type valve 78 is displaceable in bore 34. The valve element 78 is exposed at one end to the pressure in chamber 30. The other end is exposed to fuel pressures in a chamber 79 formed in casing 25. Chamber 79 is connected to a point downstream of outlet port 40 by a passageway 80. A spring 82 abuts valve element 78 to urge it towards chamber 30. The spring 82 is supported by a suitable temperature-compensating device 84 that changes the force with which the spring 82 acts on valve 78 in response to changes in fuel temperature. Additional manual adjustments to compensate for fuel types may be incorporated into device 84, as is apparent to those skilled in the art.

A first annual groove 86 is formed in the wall of bore 34 and has a radial port 88 leading to a conduit 90 which extends to conduit 18 for pump 16. Groove 86 is positioned relative to the spooled portion 92 of valve 78 so that the spooled portion is connected to the low pressure conduit 18, irrespective of the displacement of valve 78. A second annular groove 94 is formed in the wall of bore 34 and has a radial port 96 leading to a conduit 98 which extends to the pressurized conduit 20.

A pair of curved recesses 100 extends from one end of the spooled portion 92 of valve 78 toward groove 94. A second pair of curved recesses 102 is formed in the base of recesses 100. The groove 94 is positioned so that displacement of valve 78, in response to an increase in pressure in chamber 30, first uncovers recesses 102 and then uncovers recesses 100 and 102. This opens a bypass flow path from conduit 20 through the valve to low pressure conduit 18. Since valve 78 is referenced to fuel pressure downstream of orifice O, the pressure in chamber 30 is maintained at a given level above the pressure downstream of orifice O. The result is a constant pressure differential across orifice O so that the flow it meters is directly proportional to its area.

The given pressure differential is determined by the force of spring 82 and, as noted before, this pressure differential is adjusted in response to fuel temperatures by device 84 to trim the flow metered by orifice O.

As shown in FIG. 4, a series of relatively small ports 110, 112 are formed in housing 24 and lead to the inner sides of bores 32, 34 where the valve elements are displaceable. The ports 110 extend to a longitudinal supply passageway 114. The supply port 112 and the passageway 114 connect with conduit 118 and a conduit 116. Conduit 118 extends to a filter 120 posititoned in pump output conduit 20 (see FIG. 1). The filter 120 is designed so that no dirt or particulate matter reaches conduit 118. Since the pressure in conduit 20 is higher than any other pressure in valve 22, a relatively low flow of pressurized fuel is constantly delivered to the bores 32, 34 where the valve elements are displaceable. This effectively prevents the entry of dirt or particulate matter between the valve elements and the housing.

In operation, the fuel pump 16 delivers fuel to inlet ports 26, 96 thereby pressurizing chamber 28 and groove 94. When the pressure on shoulder 46 exceeds a given minimum value, the pressurizing valve element 42 is displaced from its seat on opening 36 thereby causing the valve element 42 to be displaced further by a fuel pressure acting over its entire end. As a result, the fuel pressure must be decreased to a lower pressure for closing the valve. This feature minimizes chatter and hunting tendencies of valve 42. Once flow is permitted through opening 36, fuel pressures in chamber 30 act on regulating valve 78 and fuel flows through semicircular passageway 38 to metering valve 66. Metering valve 66 then schedules flow of fuel to engine 10.

The regulating valve 78 is displaced to control bypass flow and maintain a constant pressure differential across metering valve 66. It is to be noted that the curved recesses 102 permit a relatively low rate of bypass flow for initial displacement of the valve element 78. The curved recesses 100, however, permit a relatively high flow rate for subsequent displacement. As a result, the valve element 78 has a bi-level gain for control of pressure. The recesses 102 enable a very precise control of bypass flow for small bypass flows and the spooled recesses 100 enable a gross control of flow for large bypass flows, thereby reducing the tendency of regulating valve 78 to chatter.

The spooled portion of valve 78 and recesses 100, 102 guide the entrance and exit angles of the fuel relative to the axis of valve 78 to produce a resultant opening force against the urging of spring 82. The curvatures of the spooled portion and recesses are selected so that the magnitude of the resultant opening force equals the increase in closing force caused by compression of spring 82 for high flow rates and compensates for other forces. Therefore, the axial displacement of valve 78 to regulate pressure is unaffected by changes in bypass flow.

Since the passageway 38 leading to metering valve 66 is semicircular in cross section and extends alongside the bore 32, it has a substantial flow area for the compact size of the multifunction valve. This minimizes the pressure drop between the chamber 30 and the interior chamber 70 of metering valve element 66. This feature is important since the pressure differential across the orifice O is regulated by the pressure in chamber 30 and any difference in pressure between chamber 30 and chamber 70 would result in an error.

The tubes 69, 71 in metering valve element 66 enable an equalization of pressures on their opposite axial faces. As a result, the only force that tends to impair free movement of valve 66 is the radial pressure force caused by the differential across that part of valve 66 blocking flow through port 40. This is a relatively small force, thereby permitting valve 66 to be displaced by a low force input mechanism.

Should an emergency situation arise where the pressure in the system exceeds a given safe level, valve elements 42 abut support 60 and the poppet 54 is displaced away from relief port 50 to permit a relief flow path from chamber 28 to the interior of valve 42. Ports 64 and the tubes 69, 71 then provide a flow path for the fuel to the exterior of housing 24 where the fuel can be collected at a low pressure discharge point. The radial flange 58 of the poppet 54 deflects the fuel radially outward providing an upward force to offset the closing (downward) force of the spring 56 as the valve opens, thereby maintaining the relief pressure essentially constant regardless of the quantity of flow passing through.

Since the poppet 54 is positioned between spring 56 and the valve element 42, a single spring is provided for the pressurizing and for the relief valve function. This is possible because the large area of the end of valve element 42 produces sufficient force to displace valve 42 in response to pressures experienced during the pressurizing function and the small exposed area of poppet 54 produces sufficient force to displace poppet 54 for the much higher relief pressure levels.

When it is desired to shut down enegine 10, the valve 65 is opened to vent conduit 20 to the low pressure discharge point. As a result, the pressure in chamber 28 is sufficiently decreased to enable valve 42 to displace against opening 36 and act as a cutoff valve.

The multifunction valve assembly described above provides a highly exective means for providing a number of control functions in a gas turbine engine fuel control system. The valve assemblies are flow compensated so that with a given compact size the valve assembly can precisely maintain the pressures it is required to control.

Having thus described the invention, what is claimed as novel and desired to be secured by Letters Patent of the United States is:

1. A multiple-function fuel control valve for use in a fuel control system of a gas turbine engine, said valve comprising:
   a generally cylindrical elongated housing having an inlet port adjacent the middle thereof for receiving pressurized fuel and an outlet port adjacent a first end for delivering fuel to said gas turbine engine, said housing having: a chamber connected to said inlet port and formed in the middle of said housing, a first longitudinal bore extending from said chamber to the first end of said housing and eccentric relative to the axis thereof, and a second bore extending from said chamber to the second end of said housing and coaxial therewith;
   means for forming an orifice in said inlet chamber to separate said chamber into a first section connected to said inlet port and said first bore and a second section connected to said second bore;
   means for forming a flow path having a generally semi-circular cross-sectional shape and extending from the second section of said chamber through said housing alongside of said first bore to the outer end of said first bore approximately in line with said outlet;
   means displaceable in the inner end of said first bore in response to fuel pressure in the first section of said chamber for permitting flow through said orifice to the second section of said chamber when a predetermined pressure in the first section is exceeded;
   means displaceable in said second bore and responsive to pressure in the second section of said chamber and pressure downstream of said outlet port for controlling the pressure in said inlet port to a predetermined level above the pressure in said outlet port;
   means displaceable in the outer end of said first bore in response to exterior control inputs for forming a variable area orifice whereby the flow from said fuel control valve is directly proportional to the area of said orifice.

2. A flow control valve as in claim 1 wherein said variable area orifice means comprises a metering valve element displaceable in said first bore and having a first port receiving fuel from said flow path means and a second port cooperating with said outlet port to form a variable area orifice, said valve element being adapted for linear and rotational displacement whereby the area of said orifice is the product of said displacements.

3. A flow control valve as in claim 1 wherein said flow-permitting means comprises:
   a pressurizing valve element displaceable in said first bore and having a generally beveled outer end adapted to seat in said orifice for blocking flow, said valve element having a shoulder formed adjacent said end so that the shoulder has an effective area exposed to fuel pressure which act to urge the valve away from said orifice when the valve is seated against said orifice;
   means for yieldably urging said valve element toward said orifice;
   whereby said valve element is urged from said orifice with fuel pressure acting on the effective area of said shoulder, and when the valve element is unseated the valve element is urged to its end of stroke by fuel pressures acting on the entire end area of said valve element to stabilize the opening of said valve.

4. A flow control valve as in claim 3 further comprising:
   means carried by said pressurizing valve element for permitting a relief flow path from the outer side of said pressurizing valve element to the inner side thereof when the pressure in the first portion of said chamber exceeds a given maximum level;
   means for forming a passageway through said variable area orifice means to provide a flow path from the inner side of said pressurizing valve element to the exterior of said housing.

5. A flow control valve as in claim 4 wherein:
   said pressurizing valve element has a flow path extending from its outer end to a relief port communicating with the inner side of said valve element;
   said pressure relief means comprises a poppet valve element positioned adjacent the inner side of said pressurizing valve element and adapted to be displaced against said relief port;
   said yieldable urging means for said pressurizing valve element comprises a spring adapted to urge said poppet valve element against said relief port thereby to urge said pressurizing valve element against said orifice;
   means for positively limiting the displacement of said pressurizing valve element away from said orifice whereby an increase of fuel pressure above said given maximum level causes said poppet valve element to be displaced away from said relief port to permit a relief flow to the inner side of said pressurizing valve element.

6. A flow control valve as in claim 5 wherein said poppet valve element has a radially extending flange adjacent the end which abuts said relief port for minimizing the spring-closing forces on said poppet valve by high rates of relief flow.

7. A flow control valve as in claim 6 wherein:
   said variable area orifice means comprises a metering valve element displaceable in said first bore and having a first port receiving fuel from said flow path means and a second part cooperating with said outlet port to form a variable area orifice, said valve element being adapted for linear and rotational displacement whereby the area of said orifice is the product of said displacements;

the means for providing a flow path from the inner side of said pressurizing valve element comprises an open-ended tube extending longitudinally through said metering valve element.

8. A flow control valve as in claim 7 wherein:

said pressure control means comprises: a regulating valve element displaceable in said second bore and having one end exposed to fuel pressures in the second section of said chamber whereby the pressure therein urges said regulating valve element away from said chamber, said regulating valve element having an intermediate spooled portion and a plurality of curved recesses extending from one end of said spooled portion away from the end of said valve element exposed to fuel pressures in the second section of said chamber; means for connecting fuel pressures downstream of said metering valve element to the opposite end of said regulating valve element thereby to urge said element toward said chamber; and means for yieldably urging said regulating valve element toward said chamber;

said housing having a first annular groove in communication with the spooled portion of said regulating valve element irrespective of the displacement thereof and a port for connecting said first annular groove with a low pressure discharge point;

said housing having a second annular groove surrounding said regulating valve element and a port for connecting said second annular groove to a point adjacent the inlet port of said housing, said second groove being axially positioned from said first groove so that displacement of said regulating valve element in response to pressure in said chamber permits flow of fuel from said second groove through said curved recesses and spooled portion to said first annular groove to maintain the pressure in said chamber a predetermined level above the pressure downstream of said metering valve element;

the curved recesses and the spooled portion of said regulating valve element having sufficient curvature to produce fuel reaction forces which equalize the closing force of said spring on said regulating valve element.

9. A flow control valve as in claim 8 further comprising means for providing a limited flow path of pressurized fuel from a position upstream of said inlet port to the inner walls of said first and second bores in alignment with said valve elements to prevent entry of foreign material.

10. A flow control valve as in claim 1 wherein:

said pressure control means comprises: a regulating valve element displaceable in said second bore and having one end exposed to fuel pressures in the second section of said chamber whereby the pressure therein urges said regulating valve element away from said chamber, said regulating valve element having an intermediate spooled portion and a plurality of curved recesses extending from one end of said spooled portion away from the end of said element exposed to fuel pressures in the second section of said chamber; means for connecting fuel pressures downstream of said variable area orifice means to the opposite end of said regulating valve element thereby to urge said element toward said chamber; and means for yieldably urging said regulating valve element toward said chamber;

said housing having a first annular groove in communication with the spooled portion of said regulating valve element irrespective of the displacement thereof and a port for connecting said first annular groove with a low pressure discharge point;

said housing having a second annular groove surrounding said regulating valve element and a port for connecting said second annular groove to a point adjacent the inlet port of said housing, said second groove being axially positioned from said first groove so that displacement of said regulating valve element in response to pressure in said chamber permits flow of fuel from said second groove through said curved recesses and spooled portion to said first annular groove to maintain the pressure in said chamber a predetermined level above the pressure downstream of said variable area orifice means;

the curved recesses and the spooled portion of said regulating valve element having sufficient curvature to produce fuel reaction forces which equalize the closing force of said spring on said regulating valve element.

11. A flow control valve as in claim 10 wherein said regulating valve element has a plurality of relatively small curved recesses formed in said recesses adjacent the end which is displaced across said first annular groove so that initial displacement of said regulating valve element uncovers the relatively small recesses to produce a relatively low flow rate to said discharge point and subsequent displacement uncovers both the relatively small recesses and said recesses to produce a substantially higher flow rate.

References Cited

UNITED STATES PATENTS

| 3,139,892 | 7/1964 | McRoberts | 60—39.28 X |
| 3,246,682 | 4/1966 | McCombs | 60—39.28 |
| 3,310,939 | 3/1967 | Curran | 60—39.28 |
| 3,374,800 | 3/1968 | Wheeler | 60—39.28 |

CLARENCE R. GORDON, Primary Examiner

U.S. Cl. X.R.

251—14

PO-1050
(5/69)

UNITED STATES PATENT OFFICE
CERTIFICATE OF CORRECTION

Patent No. 3,538,707     Dated November 10, 1970

Inventor(s) Joseph A. Karol

It is certified that error appears in the above-identified patent and that said Letters Patent are hereby corrected as shown below:

Column 2, line 43, "suitably" should read -- suitable -- .

Column 5, line 36, "exective" should read -- effective ---

Column 6, line 73, "part" should read -- port -- .

Signed and Sealed
JAN 19 1971

(SEAL)
Attest:

Edward M. Fletcher, Jr.
Attesting Officer

WILLIAM E. SCHUYLER, JR
Commissioner of Patents